United States Patent [19]

Machurat et al.

[11] 4,348,311
[45] Sep. 7, 1982

[54] COUPLING AGENT COMPOSITIONS FOR COUPLING AN ELASTOMER TO A FILLER AND ELASTOMER/FILLER COMPOSITIONS CONTAINING SAME

[75] Inventors: Jean Machurat, Neuville sur Saone; Jean-Claude Morawski, Chassieu; Gerard Soula, Meyzieu, all of France

[73] Assignee: Rhone-Poulenc Industries, Paris, France

[21] Appl. No.: 233,459

[22] Filed: Feb. 11, 1981

[30] Foreign Application Priority Data

Feb. 25, 1980 [FR] France ............................ 80 04037

[51] Int. Cl.³ .................. C08K 3/30; C09C 3/10; C08K 5/34; C08L 21/02
[52] U.S. Cl. .......................... 524/530; 523/216; 523/212; 260/756; 260/762; 525/105
[58] Field of Search ............ 260/375 B, 42.15, 42.45, 260/42.47, 33.6 AQ, 762, 756

[56] References Cited

U.S. PATENT DOCUMENTS

| | | | |
|---|---|---|---|
| 3,586,699 | 6/1971 | Wu | 528/14 |
| 3,702,766 | 11/1972 | Dunham et al. | 430/196 |
| 3,810,784 | 5/1974 | Wong et al. | 428/392 |
| 3,850,872 | 11/1974 | Marzocchi | 260/42.18 |
| 3,862,882 | 1/1975 | Marzocchi | 260/42.15 |
| 3,966,531 | 6/1976 | Bargin | 526/279 |
| 4,118,536 | 10/1978 | Beardsley et al. | 528/28 |
| 4,251,281 | 2/1981 | Machurat et al. | 260/42.15 |

OTHER PUBLICATIONS

Chem. Abst., vol. 88 (24088c), Gajewski et al., 1978.
Chem. Abst., vol. 84 (32295a) 1976, Wagner et al.
Chem. Abst., vol. 74 (4410j) 1971, Ziemianski et al.
Chem. Abst., vol. 74 (142812t), Rakus et al. 1971.

*Primary Examiner*—Melvyn I. Marquis
*Assistant Examiner*—Herbert J. Lilling
*Attorney, Agent, or Firm*—Burns, Doane, Swecker & Mathis

[57] ABSTRACT

An improved elastomeric composition comprising an elastomer (e.g. a natural or synthetic rubber), a filler, and a coupling agent for coupling the elastomer to the filler is provided wherein the coupling agent comprises at least one silane and at least one succinimide. The filler preferably comprises a silica and the succinimide preferably is an alkenyl succinimide, especially an alkenyl succinimide which is the condensation product of a polyamine with an alkenyl succinic anhydride, the alkenyl portion of which has 3 to 100 carbon atoms. The use of silane and succinimide for coupling provides elastomer/filler compositions having highly desirable dynamic and static properties at a more acceptable price and odor level than possible using the silane alone as coupling agent.

23 Claims, No Drawings

COUPLING AGENT COMPOSITIONS FOR COUPLING AN ELASTOMER TO A FILLER AND ELASTOMER/FILLER COMPOSITIONS CONTAINING SAME

BACKGROUND OF THE INVENTION

1. Field of the Invention

The present invention relates to improved elastomeric compositions of matter comprising an elastomer (e.g. a natural or synthetic rubber), a filler (preferably comprising a silica), and a coupling agent for coupling said elastomer to said filler, said coupling agent comprising at least one silane and at least one succinimide, the succinimide preferably being an alkenyl succinimide which is the condensation product of a polyamine with an alkenyl succinic anhydride. The invention also relates to the novel silane/succinimide coupling agents, and to shaped articles prepared from the elastomeric compositions of the invention.

2. Description of the Prior Art

Precipitated silicas have long been known to have good reinforcing power, that is to say, to improve the technological properties of vulcanized materials, such as tensile strength, hardness, modulus, resistance to abrasion, resistance to tearing, and the like. However, there are several ways in which the vulcanized materials reinforced with commercial silicas are inferior to those filled with the best carbon blacks, e.g. less resistance to abrasion, greater retentivity after deformation, and greater dissipation of energy, and thus more heating when under dynamic strain.

Various ways of improving the performance of elastomers filled with silica have therefore been proposed. One general method for overcoming these disadvantages consists of improving the filler-elastomer bond, by using a bonding or coupling agent. However, this method necessitates selecting a coupling agent that is both cheap and effective, quite apart from the fact that it must not bring with it its own inherent disadvantages.

The effectiveness of coupling agents of the silane and particularly the mercapto-silane type is well-known and has been described in the literature, particularly in *Rubber World*, October 1970, pp. 53–58 and *European Rubber Journal*, March 1974, pp. 37–46.

Unfortunately, the use of silane coupling agents suffers from two very serious disadvantages: first, their very high cost as compared to that of the filler proper and, secondly, their odor, which virtually prevents their use beyond the threshold of 1% by weight relative to the elastomer.

SUMMARY OF THE INVENTION

Accordingly, a major object of the present invention is to provide new coupling agent compositions comprising at least one silane and at least one succinimide, and improved elastomeric filler compositions comprising same, which will overcome the disadvantage inherent in the use of a silane-only coupling agent in the bonding of an elastomer to a filler.

DETAILED DESCRIPTION OF THE INVENTION

More particularly according to the present invention, the silanes suitable for incorporation in the novel coupling agents of the invention and in the improved elastomeric compositions comprising same are of the structural formula:

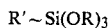

wherein R′ is a reactive organic group (such as mercapto, azo, or the like), generally connected to the silicon atom by a short alkyl chain, and OR is a hydrolyzable alkoxy group.

Preferred silanes according to the invention are sulfur-containing silanes, especially those of the type gamma-mercaptopropyltrimethoxysilane and bis(3-triethoxysilylpropyl)tetrasulfide.

It is also possible to use silanes in which the reactive group is a carbamoylazoformate.

Other possible examples include silanes of the type di(methylpropyldiethoxysilane)tetrasulfide, hexamethylcyclotrisilthiane, ethyltriethoxysilanepolysulfide and dimethylpropylethoxysilanemonosulfide.

The succinimides for use according to the invention are conveniently based on alkenyl succinimides, most suitably those obtained by condensing a polyamine with an alkenyl succinic anhydride, where the alkenyl radical contains from 3 to 100 and preferably from 3 to 12 carbon atoms.

The polyamines which can be employed to obtain the subject alkenyl succinimides include:

(I) Polyalkylene amines in which the alkylene radicals are straight or branched-chain and contain from 2 to 12 carbon atoms, or such polyalkylene amines bearing at least one hydroxyalkyl or aminoalkyl substituent on the nitrogen;

(II) Polyoxaalkylene amines in which the oxaalkylene radicals are straight or branched-chain and contain 2 to 3 carbon atoms; and (III) Tertiary aminoalkyl amines of the general formula:

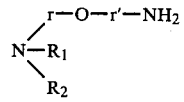

in which r represents an ethylene or propylene radical, r′ represents a trimethylene or propylene radical, $R_1$ represents an —r—O—r′—NH$_2$ or r′—NH$_2$ radical, and $R_2$ represents an —r—O—r′—NH$_2$, —r′—NH$_2$, $C_2$-$C_4$ alkyl or phenyl radical.

Exemplary of the unsubstituted polyalkylene amines (I) are:

[i] Methylene amines, such as trimethylene diamine, tetramethylene diamine, pentamethylene diamine, hexamethylene diamine, heptamethylene diamine, octamethylene diamine, nonamethylene diamine, decamethylene diamine, di(trimethylene)triamine and di(hexamethylene)triamine;

[ii] Ethylene amines, such as ethylene diamine, diethylene triamine, triethylene tetramine, tetraethylene pentamine and pentaethylene hexamine;

[iii] Propylene amines, such as propylene diamine, dipropylene triamine, tripropylene tetramine, and the like; and

[iv] Cyclic homologs thereof of the aminoalkylpiperazine type, such a 1,4-bis(2-aminoethyl)piperazine or 1,4-bis(4-aminobutyl)piperazine.

The ethylene polyamines are particularly useful. Same are described in substantial detail under the title "Diamines and Higher Amines" in *Encyclopedia of Chemical Technology*, 2nd Edition, Kirk & Othmer, Volume 7, pages 27-39, Interscience Publishers, New York (1965). These compounds may be used alone, or mixed together or with their cyclic homologs.

Exemplary of the polyalkylene amines which are substituted on the nitrogen by one or more hydroxyalkyl groups are those wherein the hydroxyalkyl group or groups contain less than 8 carbon atoms, such as: N-(2-hydroxyethyl)ethylene diamine, N,N-bis(2-hydroxyethyl)ethylene diamine, mono-hydroxypropyldiethylene triamine, dihydroxypropyltetraethylene pentamine, N-(3-hydroxypropyl)tetramethylene diamine, and the like.

Exemplary of the polyalkylene amines which are substituted on the nitrogen by one or more aminoalkyl groups are those wherein the aminoalkyl group or groups contain less than 4 carbon atoms, such as: tris(2-aminoethyl)amine, N-(2-aminoethyl)tetraethylene pentamine; N,N,N'-tris(3-aminopropyl)ethylene diamine; N,N,N',N'-tetrakis(3-aminopropyl)ethylene diamine and N-(3-aminoethyl)trimethylene diamine.

Exemplary of the polyoxaalkylene amines (II) are: 1,10-diamino-4,7-dioxadecane, 1,13-diamino-4,7,10-trioxatridecane, 1,8-diamino-3,6-dioxa-1,5,8-trimethyloctane, tris-1,2,3-(2-amino-2-methylethoxy)propane, and the like.

Other examples of polyoxaalkylene amines which can be used are described in French Pat. No. 1,547,228.

Exemplary of the tertiary aminoalkyl amines (III) which can be used are those described in French Pat. No. 75.39690 published under No. 2,307,795, particularly tris(3-oxa-6-aminohexyl)amine and N-ethyl-bis(3-oxa-6-aminohexyl)amine.

Of the alkenyl succinic anhydrides which can be used to prepare the alkenyl succinimides, exemplary are those wherein the alkenyl radical is derived from a $C_3$–$C_{30}$ mono-olefin, an oligomer or polymer of a $C_2$–$C_{30}$ mono-olefin, or a co-polymer prepared from said olefins, either together or with dienic or vinylaromatic comonomers. Preferred alkenyl succinic anhydrides are those derived from oligomers or polymers of ethylene, propylene, 1-butene, isobutene, 3-cyclohexyl-1-butene or 2-methyl-5-propyl-1-hexane.

The alkenyl succinic anhydrides can be prepared in known manner, by condensing maleic anhydride with an olefin, an oligomer, a polymer or a copolymer of the said olefin; the synthesis may be carried out by heating (U.S. Pat. No. 3,306,907) or in the presence of chlorine (U.S. Pat. No. 3,231,587) or bromine (French Pat. No. 74.18915 published under No. 2,273,014); alternatively, monochlorinated or monobrominated polyolefins may be used as the starting materials, as described in the French Patent published under No. 2,042,558.

The technique for condensing the alkenyl succinic anhydride with the polyamine to prepare the alkenyl succinimide is carried out in known manner, at a temperature ranging from 80° to 250° C. (U.S. Pat. Nos. 3,172,892 and 3,219,666; the French patent published under No. 2,307,845, etc.).

It is preferable to carry out this operation at a temperature of from 120° to 240° C., and more particularly from 130° to 230° C., with a molar ratio of polyamine to alkenyl succinic anhydride of less than 1.

When the amine used contains two primary amino groups, a molar ratio of from 0.4 to 0.6 will make it possible to obtain compositions containing a major part of bis-alkenyl succinimides; a molar ratio in the vicinity of 1, and preferably from 0.7 to 0.95, will provide compositions containing a major part of monoalkenyl succinimides. When the amine contains three primary amino groups, a molar ratio of from 0.2 to 0.4 will give a tris-succinimide.

In one embodiment of the present invention, at least half of the silane intended for use in the elastomer-based formulation is replaced by at least one succinimide. Thus, the silane/succinimide coupler component is desirably 1 part by weight silane to at least one part by weight succinimide. It is preferred to use at least two and advantageously three parts by weight of succinimide per part by weight of silane. In accordance with the invention, it is advantageous to add at least four parts by weight of the silane/succinimide coupling agent composition according to the invention to every 100 parts by weight of silica used as filler in the elastomer/filler composition.

The various constituents of the elastomeric composition may be fed in together or separately. If desired, the silane and succinimide can be mixed together prior to their being combined with the other constituents.

The filled composition may comprise any base polymer; advantageously, however, it comprises an elastomeric substance, such as natural rubber or SBR.

In elastomeric materials such as copolymers of styrene-butadiene (SBR) or natural rubbers, it is known that 1 to 60 parts by weight of oil per 100 parts of elastomer is customarily added. In accordance with the present invention, a few percent and particularly from about 1 to 5% by weight relative to the plasticizer, is sufficient to obtain significant results. The plasticizer preferably comprises an oil, advantageously one based on aromatic, naphthenic or paraffinic hydrocarbons extracted from certain petroleum fractions.

The filler utilized according to the invention advantageously comprises an inorganic filler, which can be natural or synthetic. Among these, fillers based on silicas and synthetic silicates are preferred but the invention is not restricted to these.

The present invention is, however, especially applicable to elastomeric compositions comprising synthetic silicas, particularly precipitated silicas, as fillers, e.g. those of copending application, Ser. No. 218,264, filed Dec. 19, 1980 Pending Group 113, and assigned to the assignee hereof.

Such silicas are prepared utilizing any one of a number of processes.

In a first type of process, an acidifying agent such as carbonic anhydride or an inorganic acid, is added to an aqueous silicate solution; the addition is stopped when opalescence appears, and an aging time is observed before the acidification of the medium is resumed, as, for example, in the processes described in French Patent Publication No. 2,208,950 or U.S. Pat. No. 3,503,797.

In a second type of process, the first interruption of acid addition takes place beyond the opalescence point, i.e. between opalescence and gelling, as in French Patent Publication No. 2,159,580.

In a third type of process, the addition of acid need not be interrupted, a solution of alkali metal silicate and an acid solution may be added simultaneously to a silicate solution, as, for example, in French Patent Publication No. 1,352,354.

There are obviously many possible modifications to these processes which make it possible to control the properties of the resultant silica particulates, and the above description is not in any intended to restrict the type of silica which may be used within the ambit of the present invention.

The use of a combination of silane and succinimide as a coupler for elastomer/filler compositions according to the present invention surprisingly provides an improvement in the filled elastomeric material's dynamic and static properties, particularly as regards heating, permanent deformation, the modulus and abrasion resistance, while allowing the quantity of silane to be small enough to give the elastomeric product an acceptable price and a tolerable odor level.

In order to further illustrate the present invention and the advantages thereof, the following specific examples are given, it being understood that same are intended only as illustrative and in nowise limitative.

In the following examples, the representative succinimide used was the result of condensation of tetraethylene pentamine with tetrapropenyl succinic anhydride, prepared in the following manner:

A 2-liter 3-necked flask was used, fitted with a mechanical agitator, a bromine funnel, a thermometer and a distillation head, followed by a condenser and a receiver. 665 g of tetrapropenyl succinic anhydride (i.e., 2.5 moles) were poured into the flask and heated to 130° C.

189 g of tetraethylene pentamine (i.e., 2 moles) were then introduced over 30 min. The mixture was brought to 160° C. at a pressure of 25 mm Hg. When all of the water formed in the course of the reaction had distilled (3 hours), the mixture was cooled.

The nitrogen analysis was as follows:

| theory | = 14% |
|---|---|
| measured | = 13.8% |

Infra-red analysis revealed that all of the succinic anhydride functions had reacted. The presence of characteristic bands of the succinimide group was noted.

[The preparation of other suitable succinimides is illustrated in our copending application, Ser No. 218,265 for "COMPATIBLY FILLED/PLASTICIZED POLYMERIC COMPOSITIONS" filed Dec. 19, 1980, now U.S. Pat. No. 4,322,336, and assigned to the assignee hereof, and herby incorporated by reference herein in its entirety and relied upon.]

The silica used in the following examples was a precipitated silica, marketed by the assignee hereof under the name of Zeosil 45. Its main properties were as follows:

| [i] | weight loss when heated to 900° C. | 12.5 max. |
|---|---|---|
| [ii] | pH (5 g/100 cc) | 6.5 ± 0.3 |
| [iii] | BET surface area | 200 m²/g |
| [iv] | Diameter of ultimate particles | ~20 m μm |
| [v] | DOP oil absorption (dioctylphthalate) | at least 300 cc per 100 g |
| [vi] | Amount of particles of a size as to be retained on screen according to ASTM 80 mesh % | 5% |

EXAMPLE 1

The silane employed was gamma-mercaptopropyltrimethoxysilane, marketed by Union Carbide under the name of A 189.

Tests were carried out on a rubber mix. Preparation took place in a 1-liter BANBURY internal mixer, then was continued in a mixer with cylinders.

The following tests were carried out:

MECHANICAL, STATIC AND DYNAMIC TESTS (1) Monsanto Rheometer (ASTM D 2084):

Measured the rheological properties of the mix during vulcanization:

Minimum torque (mC): consistency of unvulcanized mix ("crude" mix) at testing temperature;

Maximum torque (MC): consistency of mix after cross-linking;

Δtorque: MC-mC, related to the cross-linking rate;

Induction Period: time taken to initiate cross-linking at testing temperature (also termed "Scorch time")

Index: related to the speed of vulcanization (optimum time-induction period);

$$\text{Optimum time: } X = \frac{(MC - mC) \times 90}{100} + mC$$

Torque $X \longrightarrow Y$ minutes
(ordinate)   (abscissa)

Y mn = optimum time.

These properties are described in particular in the *Encyclopedia of Polymer Science and Technology*, Volume 12, page 265 (Interscience Publishers-John Wiley & Sons, Inc.).

(2) Static properties:

Those which are measured in accordance with the following standards:
(a) ASTM D 412-51 T
  Resistance to breaking Pa (tensile strength)
  Elongation %
  Modulus (Pa)
(b) ASTM D 2240-75
  Shore A hardness
(c) DIN 53516
  Abrasion (resistance to)
(d) ADHESION
  SKID TESTER (in accordance with road research, Laboratory Crowthorne Berkshire GB)
(e) NFT 47-126
  Tear Strength (tear resistance)

(3) Dynamic properties:

ASTM D 623-67
Goodrich Flexometer

This apparatus is for subjecting a vulcanized material to alternating deformations to determine its resistance to fatigue.
(a) Static compression (SC %): deflection under constant load.
(b) Permanent deformation (PD %): % of residual deformation after test.
(c) Dynamic compression (DC %): % of deformation during test.
ODC: Dynamic compression at beginning of test.
FDC: Dynamic compression at end of test.
ΔDC=FDC−ODC: development of dynamic compression; related to resistance to fatigue.
(d) ΔT base: ΔT between the temperature at the surface of the sample (at its base) and the temperature of the chamber.

(e) ΔT core: ΔT between the temperature at the core of the sample and the temperature of the chamber.
(f) Test conditions:
load 24 lbs, deflection 22.2%, frequency 21.4 Hz, temperature of chamber=50° C.

In this example a series of tests was carried out, using the following formulation in parts by weight:

| | | |
|---|---|---|
| [i] | Butadiene-styrene co-polymer extended with oils + (SBR 1712) | 60.00 |
| [ii] | Polybutadiene (BR 1220) | 40.00 |
| [iii] | Silica | 60.00 |
| [iv] | Aromatic oil (Dutrex 729 FC) | 20.00 |
| [v] | Zinc oxide | 4.00 |
| [vi] | Stearic acid | 1.50 |
| [vii] | N-Isopropyl-N-phenyl-N'-phenylenediamine (antioxidant PERMANAX IPPD) | 1.50 |
| [viii] | N-(1,3-Dimethylbutyl)-N'-phenyl-p-phenylenediamine (antioxidant PERMANAX 6 PPD) | 1.50 |
| [ix] | Polyethylene glycol (PEG 4000) | 3.00 |
| [x] | N-Cyclohexyl-2-benzothiozyl sulfenamide (Vulcafor CBS) | 3.00 |
| [xi] | Coupling agent according to tests | (See Table 1) |
| [xii] | Sulfur | 2.80 |

The set of tests is summarized in Table 1 below.

It will be seen that in test series 1 to 5, the effect of silane alone as a coupling agent was studied; in tests 6 to 9, the effect of succinimide alone was noted; in tests 10 to 12, both succinimide and an increasing quantity of silane were included; while in the last tests 13 to 14, a larger quantity of succinimide was added.

Tables II to V below summarize the results for each series of tests.

To facilitate interpretation of the results, the essential features have been summarized in the following comparative tables:
from 0 to 4% of succinimide: Table VI
from 0 to 4% of silane: Table VII
combination of silane and succinimide: Table VIII
most outstanding combinations of silane and succinimide: Table IX

TABLE I

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Silanes (% on silica) | 0 | 1 | 2 | 3 | 4 | 0 | 0 | 0 | 0 | 1 | 2 | 3 | 1 | 2 | 1 |
| Succinimide (% on silica) | 0 | 0 | 0 | 0 | 0 | 1 | 2 | 3 | 4 | 1 | 1 | 1 | 2 | 2 | 3 |

TABLE II

| TESTS | 1 | | 2 | | 3 | | 4 | | 5 | |
|---|---|---|---|---|---|---|---|---|---|---|
| Silane (% on silica) | 0 | | 1 | | 2 | | 3 | | 4 | |
| Succinimide (% on silica) | 0 | | — | | — | | — | | — | |
| Rheometer at 150° C. | | | | | | | | | | |
| Torque: Min Max | 18.5–94.0 | | 16–96 | | 14.5–90.5 | | 18.5–90.5 | | 18.5–90 | |
| Δ Torques | 75.5 | | 80.0 | | 76.0 | | 72.0 | | 71.5 | |
| Induction Period - Index | 9mn30s–3mn15s | | 10mn–4mn | | 8mn–4mn15s | | 6mn30s–2mn45s | | 5mn30s–3mn15s | |
| Optimum | 12mn45s | | 14mn | | 12mn15s | | 9mn15s | | 8mn45s | |
| STATIC PROPERTIES | | σ | | σ | | σ | | σ | | σ |
| Resistance to breaking (1) | 94.3 | 5.7 | 101 | 9 | 119 | 1.1 | 153 | 3.2 | 151 | 6.1 |
| Shore A hardness | 67 | — | 66 | — | 69 | — | 71 | — | 70 | — |
| Modulus at 100% Eln. (1) | 15 | 0.8 | 21 | 1.5 | 27 | 0.9 | 35 | 2.4 | 37 | 1.4 |
| Modulus at 300% Eln. (1) | 37 | 1.1 | 69 | 2 | 96 | 3 | 123 | 3.4 | 120 | 4 |
| Elongation % | 567 | 23 | 445 | 17 | 410 | 20 | 357 | 13 | 345 | 14 |
| Abrasion DIN (losses) | 168 | — | 121 | — | 122 | — | 110 | — | 98 | — |
| Adhesion - moist track SKID TESTER | 40 | — | 41 | — | 42 | — | 42 | — | 42 | — |
| GOODRICH FLEXOMETER | | | | | | | | | | |
| Static compression % (SC) | 11 | | 10 | | 9.9 | | 9.6 | | 10.25 | |
| Original dynamic compression (ODC) % | 8 | | 3.55 | | 2.6 | | 2.1 | | 2.3 | |
| Final dynamic compression (FDC) % | 9.8 | | 4.10 | | 3.1 | | 2.4 | | 2.45 | |
| Δ FDC-ODC | 1.8 | | 0.55 | | 0.5 | | 0.3 | | 0.15 | |
| Δ T. base °C. | 27 | | 20 | | 20.5 | | 19.5 | | 19.0 | |
| Δ T. core °C. | 105 | | 77.5 | | 75.0 | | 70.5 | | 66.0 | |
| Permanent deformation % | 5.05 | | 1.95 | | 1.95 | | 1.8 | | 1.6 | |

σ = standard deviation
(1) expressed in Pa, to be multiplied by $10^5$

TABLE III

| TESTS | 6 | 7 | 8 | 9 |
|---|---|---|---|---|
| Silane (% on silica) | — | 0 | 0 | 0 |
| Succinimide (% on silica) | 1 | 2 | 3 | 4 |
| Rheometer at 150° C. | | | | |
| Torque: Min Max | 19–97 | 17.5–94 | 15–93 | 11–88.5 |
| Δ Torques | 78 | 76.5 | 78 | 77.5 |

TABLE III-continued

| Induction Period - Index Optimum | 10mn-4mn15s 14mn15s | | 9mn30-4mn 13mn30s | | 8mn-5mn 13mn00s | | 6mn30-6mn 12mn30s | |
|---|---|---|---|---|---|---|---|---|
| STATIC PROPERTIES | | σ | | σ | | σ | | σ |
| Resistance to breaking (1) | 80 4 | 4.4 | 88 8 | 3.6 3 | 77.5 7 | 4.5 4 | 83 8 | 4.7 4 |
| Shore A hardness | 66 | — | 65 | — | 66 | — | 66 | — |
| Modulus at 100% Eln. (1) | 17 | 1.9 | 17 | 1 | 17 | 0.6 | 17.6 | 1 |
| Modulus at 300% Eln. (1) | 44.5 | 2.6 | 44.5 | 1.3 | 45.5 | 0.8 | 47 | 3.5 |
| Elongation % | 440 | 26.5 | 456 | 32 | 435 | 15 | 380 | 23 |
| Abrasion DIN (losses) | 169 | — | 169 | — | 170 | — | 166 | — |
| Adhesion - moist track SKID TESTER | 40 | — | 40 | — | | | | |
| GOODRICH FLEXOMETER | | | | | | | | |
| Static compression % (SC) | 11.0 | | 10.9 | | 10.4 | | 12.3 | |
| Original dynamic compression (ODC) % | 5.5 | | 5.95 | | 5.55 | | 7.4 | |
| Final dynamic compression (FDC) % | 7.3 | | 8.25 | | 7.15 | | 9.2 | |
| Δ FDC-ODC | 1.8 | | 2.30 | | 1.55 | | 1.80 | |
| Δ T. base °C. | 26 | | 27.5 | | 27.0 | | 27.0 | |
| Δ T. core °C. | 97.5 | | 104.5 | | 102.5 | | 100.0 | |
| Permanent deformation % | 4.05 | | 4.35 | | 3.7 | | 3.5 | |

σ = standard deviation
(1) expressed in Pa, to be multiplied by $10^5$

TABLE IV

| TESTS | 10 | | 11 | | 12 | |
|---|---|---|---|---|---|---|
| Silane (% on silica) | 1 | | 2 | | 3 | |
| Succinimide (% on silica) | 1 | | 1 | | 1 | |
| Rheometer at 150° C. | | | | | | |
| Torque: Min Max | 21-98 | | 20-92 | | 20-92 | |
| Δ Torques | 77 | | 72 | | 72 | |
| Induction Period - Index Optimum | 10mn30s-3mn45s 14mn15s | | 7mn-3mn 10mn | | 6mn-3mn 9mn | |
| STATIC PROPERTIES | | σ | | σ | | σ |
| Resistance to breaking (1) | 91 | 3.9 | 133 | 10 | 147 | 7 |
| Shore A hardness | 70 | — | 69 | — | 70 | — |
| Modulus at 100% Eln. (1) | 22.5 | 1.7 | 27.3 | 1.3 | 36.7 | 2.4 |
| Modulus at 300% Eln. (1) | 62 | 2.1 | 110 | 3.5 | 127 | 3.8 |
| Elongation % | 365 | 26 | 340 | 11.5 | 330 | 13.5 |
| Abrasion DIN (losses) | 131 | — | 123 | — | 108 | — |
| Adhesion - moist track SKID TESTER | 41 | — | 41 | — | 42 | — |
| GOODRICH FLEXOMETER | | | | | | |
| Static compression % (SC) | 10.1 | | 9.7 | | 10.0 | |
| Original dynamic compression (ODC) % | 3.4 | | 2.4 | | 2.05 | |
| Final dynamic compression (FDC) % | 3.45 | | 2.5 | | 2.1 | |
| Δ FDC-ODC | ≈0 | | ≈0 | | ≈0 | |
| Δ T. base °C. | 22.5 | | 20.5 | | 19 | |
| Δ T. core °C. | 79.0 | | 68.5 | | 65 | |
| Permanent deformation % | 2.45 | | 1.9 | | 1.7 | |

σ = standard deviation
(1) expressed in Pa, to be multiplied by $10^5$

TABLE V

| TESTS | 13 | | 14 | | 15 | |
|---|---|---|---|---|---|---|
| Silane (% on silica) | 1 | | 2 | | 1 | |
| Succinimide (% on silica) | 2 | | 2 | | 3 | |
| Rheometer at 150° C. | | | | | | |
| Torque: Min Max | 20-92.5 | | 22-90.5 | | 20-90.5 | |
| Δ Torques | 72.5 | | 68.5 | | 70.5 | |
| Induction Period - Index Optimum | 7mn30-3mn30s 11mn | | 6mn-2mn45s 8mn45s | | 50mn30s-2mn30s 8mn | |
| STATIC PROPERTIES | | σ | | σ | | σ |
| Resistance to breaking (1) | 119.5 | 6.8 | 138 | 9.3 | 132 | 5.1 |
| Shore A hardness | 68 | — | 69 | — | 69 | — |
| Modulus at 100% Eln. (1) | 25 | 2 | 32 | 2.2 | 32 | 2.3 |
| Modulus at 300% Eln. (1) | 88 | 4 | 112 | 2.4 | 120 | 6 |

TABLE V-continued

| | | | | | | |
|---|---|---|---|---|---|---|
| Elongation % | 366 | 17 | 350 | 8.75 | 345 | 11.7 |
| Abrasion DIN (losses) | 132 | — | 121 | — | 121 | — |
| Adhesion - moist track SKID TESTER | 42 | — | 42 | — | 43 | — |
| GOODRICH FLEXOMETER | | | | | | |
| Static compression % (SC) | | | 10.1 | | 9.9 | 10.3 |
| Original dynamic compression (ODC) % | | | 2.65 | | 2.5 | 2.5 |
| Final dynamic compression (FDC) % | | | 2.90 | | 2.6 | 2.5 |
| Δ FDC-ODC | | | 0.25 | | ≈0 | ≈0 |
| Δ T. base °C. | | | 21.0 | | 20.0 | 20.0 |
| Δ T. core °C. | | | 73.0 | | 70.5 | 67.0 |
| Permanent deformation % | | | 2.10 | | 1.75 | 1.45 |

σ = standard deviation
(1) expressed in Pa, to be multiplied by $10^5$

TABLE VI

| Tests | Silane | Succinimide | Resistance to breaking (1) | Shore A Hardness | Modulus 300% (1) | Abrasion DIN | Adhesion, moist track (μ) | Δ FDC-ODC | Δ T core | Permanent Deformation % | Odor (Silane) |
|---|---|---|---|---|---|---|---|---|---|---|---|
| 1 | 0 | 0 | 94.3 | 67 | 37 | 168 | 40 | +1.8 | 105.0 | 5.05 | — |
| 6 | 0 | 1 | 80.0 | 66 | 44.5 | 169 | 40 | +1.8 | 97.5 | 4.05 | — |
| 7 | 0 | 2 | 88.0 | 65 | 44.5 | 169 | 40 | +2.3 | 104.5 | 4.35 | — |
| 8 | 0 | 3 | 77.5 | 66 | 45.5 | 170 | 40 | +1.55 | 102.5 | 3.7 | — |
| 9 | 0 | 4 | 83 | 66 | 47.0 | 166 | 40 | +1.8 | 100.0 | 3.5 | — |

(1) expressed in Pa, to be multiplied by $10^5$

TABLE VII

| Tests | Silane | Succinimide | Resistance to breaking (1) | Shore A Hardness | Modulus 300% (1) | Abrasion DIN | Adhesion, moist track (μ) | Δ FDC-ODC | Δ T core | Permanent Deformation % | Odor (Silane) |
|---|---|---|---|---|---|---|---|---|---|---|---|
| 1 | 0 | 0 | 94.3 | 67 | 37 | 168 | 40 | +1.8 | 105.0 | 5.05 | — |
| 2 | 1 | 0 | 101 | 66 | 69 | 121 | 41 | +0.55 | 77.5 | 1.95 | Weak |
| 3 | 2 | 0 | 119 | 69 | 96 | 122 | 42 | +0.5 | 75.0 | 1.95 | Average |
| 4 | 3 | 0 | 153 | 71 | 123 | 110 | 42 | +0.3 | 70.5 | 1.8 | Very Strong |
| 5 | 4 | 0 | 151 | 70 | 120 | 98 | 42 | +0.15 | 66.0 | 1.6 | Pungent |

(1) expressed in Pa, to be multiplied by $10^5$

TABLE VIII

| Tests | Silane | Succinimide | Resistance to breaking (1) | Shore A Hardness | Modulus 300% (1) | Abrasion DIN | Adhesion, moist track (μ) | ΔFDC-ODC | Δ T core | Permanent Deformation % | Odor Silane |
|---|---|---|---|---|---|---|---|---|---|---|---|
| 1 | 0 | 0 | 94.3 | 67 | 37 | 168 | 40 | +1.8 | 105.0 | 5.05 | — |
| 2 | 1 | 0 | 101 | 66 | 69 | 121 | 41 | +0.55 | 77.5 | 1.95 | Weak |
| 10 | 1 | 1 | 94 | 70 | 62 | 131 | 41 | ~0 | 79.0 | 2.45 | Weak |
| 13 | 1 | 2 | 119.5 | 68 | 88 | 132 | 42 | +0.25 | 73.0 | 2.1 | Weak |
| 15 | 1 | 3 | 132 | 69 | 120 | 121 | 43 | ~0 | 67.0 | 1.45 | Weak |
| 3 | 2 | 0 | 119 | 69 | 96 | 122 | 42 | +0.5 | 75.0 | 1.95 | Average |
| 11 | 2 | 1 | 133 | 69 | 110 | 123 | 41 | ~0 | 68.5 | 1.9 | Average |
| 14 | 2 | 2 | 138 | 69 | 112 | 121 | 42 | ~0 | 70.5 | 1.75 | Average |
| 4 | 3 | 0 | 153 | 71 | 123 | 110 | 42 | +0.3 | 70.5 | 1.8 | Very Strong |
| 12 | 3 | 1 | 147 | 70 | 127 | 108 | 42 | ~0 | 65.0 | 1.7 | Very Strong |

(1) expressed in Pa, to be multiplied by $10^5$

TABLE IX

| Tests | Silane | Succinimide | Resistance to breaking (1) | Shore A Hardness | Modulus 300% (1) | Abrasion DIN | Adhesion, moist track (μ) | Δ FDC-ODC | Δ T core | Permanent Deformation % | Odor (Silane) |
|---|---|---|---|---|---|---|---|---|---|---|---|
| 1 | 0 | 0 | 94.3 | 67 | 37 | 168 | 40 | +1.8 | 105.0 | 5.05 | — |
| 4 | 3 | 0 | 153 | 71 | 123 | 110 | 42 | +0.3 | 70.5 | 1.8 | Very strong |
| 5 | 4 | 0 | 151 | 70 | 120 | 98 | 42 | +0.15 | 66.0 | 1.6 | Pungent |
| 12 | 3 | 1 | 147 | 70 | 127 | 108 | 42 | 0 | 65.0 | 1.7 | Very strong |
| 15 | 1 | 3 | 132 | 69 | 120 | 121 | 43 | 0 | 67.0 | 1.45 | Weak |

(1) expressed in Pa, to be multiplied by $10^5$

Referring to Tables VI, VII, VIII and IX, it will first be noted from (Table VII) that the silane had a considerable positive effect on the group of mechanical properties.

With 1% of silane, an appreciable gain was observed in the modulus at 300%, loss through abrasion (−30%), the ΔFDC-ODC, permanent deformation and heating. The improvement reaches its best overall level with 3% of silane, but the odor is very strong.

When succinimide was substituted for the silane (Table VI) the improvement due to this compound was less than that obtained with silane alone. On the other hand, when succinimide was substituted for part of the silane a remarkable synergic effect was observed (Table VIII), which showed itself in the essential properties such as resistance to breaking, modulus and heating. The effect was remarkable even with 1% of silane, which made it possible to have a weak, acceptable odor. An excellent result was obtained with 3% of succinimide and 1% of silane.

In the second part of Table VIII (tests 3, 11, 14), the proportion of silane was increased, and an improvement due to the succinimide was noted.

Finally, in the last two tests (4 and 12) shown in Table VIII, the proportion of silane was increased, and the addition of succinimide made it possible to improve the heating.

It is apparent from the foregoing results that the addition of succinimide generally enables heating and viscosity to be reduced, but there is a surprising synergic action with silane, resulting in quite spectacular improvements for selected silane/succinimide ratios.

This is brought out even better in Table VIII, where tests with a high content of silane are set out together with the test which gave the best results in the present case (test 15).

This example thus shows the quite unexpected and spectacular effect of the compositions according to the invention. The silane/succinimide ratios are not of course given in any restrictive sense, since the tests were carried out with a given formulation and also with a specific silane and succinimide.

EXAMPLE 2

In this example natural rubber was used, but with the same silica, the same succinimide and the same silane as employed above.

The formulation was as follows, in parts by weight:

| | | |
|---|---|---|
| [i] | Natural rubber SMR 5L | 100.00 |
| [ii] | Stearic acid | 1.50 |
| [iii] | Zinc oxide | 4.00 |
| [iv] | Antioxidant (PERMANAX I PPD) | 1.50 |
| [v] | Antioxidant (PERMANAX 6 PPP) | 1.50 |
| [vi] | Vulcafor CBS | 1.80 |
| [vii] | Oil DUTREX 729 FC | 20.00 |
| [viii] | Silica | 60.00 |
| [ix] | Polyethylene glycol (PEG 4000) | 3.00 |
| [x] | Sulfur | 2.80 |
| [xi] | Silane and succinimide | (See Table X.) |

The mixture was prepared in the same way as in EXAMPLE 1.

TABLE X

| Tests | 16 | 17 | 18 | 19 | 20 | 21 | 22 | 23 | 24 | 25 |
|---|---|---|---|---|---|---|---|---|---|---|
| Succinimide (% of silica) | 0 | 2 | 4 | 6 | 0 | 0 | 0 | 0 | 3 | 3 |
| Silane (% of silica) | 0 | 0 | 0 | 0 | 1 | 2 | 3 | 4 | 1.0 | 1.5 |

The results are set out in Tables XI, XII and XIII.

It is to be noted that the combination of succinimide with silane still gives results equivalent to those observed with silane alone.

TABLE XI

| TESTS | 16 | | 17 | | 18 | | 19 | |
|---|---|---|---|---|---|---|---|---|
| Silane (% on silica) | 0.0 | | 0.0 | | 0.0 | | 0.0 | |
| Succinimide (% on silica) | 0.0 | | 2.0 | | 4.0 | | 6.0 | |
| Rheometer at 150° C. | | | | | | | | |
| Torque: Min Max | 24–91 | | 24–85 | | 16–83 | | 11–76 | |
| Δ Torques | 67 | | 64 | | 67 | | 65 | |
| Induction period-Index | 7mn45s–9mn30s | | 7mn–8mn30s | | 4mn45s–8mn30s | | 45mn45s–8mn30s | |
| Optimum vulcanization time | 17mn15s | | 15mn30s | | 13mn15s | | 13mn | |
| STATIC PROPERTIES | | σ | | σ | | σ | | σ |
| Resistance to breaking (1) | 200 | 12.7 | 203 | 11.3 | 205 | 9 | 203 | 6.5 |
| Shore A hardness | 72 | | 68 | | 68 | | 67 | |
| Modulus at 100% Elongation (1) | 13.7 | 0.3 | 14.7 | 1.2 | 14.2 | 0.8 | 13.7 | 1.4 |
| Modulus at 300% Elongation (1) | 30 | 1.4 | 34 | 1.5 | 33 | 2.8 | 30 | 3.7 |
| Elongation % | 728 | 20.5 | 715 | 16.5 | 722 | 32 | 734 | 37 |
| Trouser tearing kg/cm | 36.2 | 2.2 | 35.0 | 1.8 | 35.9 | 4.1 | 35.5 | 3.5 |
| Abrasion DIN (losses) | 232 | | 235 | | 229 | | 251 | |
| GOODRICH FLEXOMETER | | | | | | | | |
| load 24 lbs, deflection 22.2%, F 21.4 Hz, temperature 50° C. | | | | | | | | |
| Static compression (SC) % | 10.0 | | 10.3 | | 10.2 | | 11.9 | |
| Original dynamic compression (ODC) % | 14.1 | | 11.3 | | 11.0 | | 11.2 | |
| Final dynamic compression (FDC) % | 39.4 | | 28.4 | | 21.5 | | 20.7 | |
| Δ FDC-ODC | 25.3 | | 17.1 | | 10.5 | | 9.5 | |
| Δ T. base | 73 | | 45 | | 33.5 | | 27.0 | |
| Δ T. core | → 150 | | 128 | | 105 | | 94.0 | |
| Permanent deformation % | 33.1 | | 18.0 | | 11.87 | | 10.3 | |

(1) expressed in Pa, to be multiplied by $10^5$
σ = standard deviation

TABLE XII

| TESTS | 20 | 21 | 22 | 23 |
|---|---|---|---|---|
| Silane (% silica) | 1.0 | 2.0 | 3.0 | 4.0 |

TABLE XII-continued

| TESTS | 20 | | 21 | | 22 | | 23 | |
|---|---|---|---|---|---|---|---|---|
| Succinimide (% on silica) | 0.0 | | 0.0 | | 0.0 | | 0.0 | |
| Rheometer at 150° C. | | | | | | | | |
| Torque: Min Max | 21–88 | | 15–78 | | 12.5–76 | | 13–76.5 | |
| Δ Torques | 67 | | 63 | | 63.5 | | 63.5 | |
| Scorch time - index | 5mn30s–7mn30s | | 4mn45s–5mn30s | | 3mn30s–6mn30s | | 2mn30s–6mn30s | |
| Optimum vulcanization time | 13mn | | 10mn15s | | 10mn | | 9mn | |
| STATIC PROPERTIES | | σ | | σ | | σ | | σ |
| Resistance to breaking (1) | 223 | 10 | 237 | 7.5 | 233 | 11.3 | 238 | 12.2 |
| Shore A hardness | 72 | | 70 | | 68 | | 69 | |
| Modulus at 100% Elongation (1) | 16.6 | 1.6 | 20 | 2 | 19 | 2 | 17.6 | 1.7 |
| Modulus at 300% Elongation (1) | 57 | 3.7 | 63 | 4.7 | 66 | 5 | 65 | 3.5 |
| Elongation % | 735 | 14 | 736 | 22 | 671 | 33 | 655 | 16 |
| Trouser tearing kg/cm | 38.7 | 2.1 | 43.3 | 2.7 | 39.7 | 6.0 | 41.5 | 3.7 |
| Abrasion DIN (losses) | 186 | | 184 | | 177 | | 163 | |
| GOODRICH FLEXOMETER | | | | | | | | |
| load 24 lbs, deflection 22.2%, F 21.4 Hz, temperature 50° C. | | | | | | | | |
| Static compression (SC) % | 9.0 | | 9.4 | | 11.9 | | 12.2 | |
| Original dynamic compression (ODC) % | 6.6 | | 7.0 | | 8.0 | | 8.25 | |
| Final dynamic compression (FDC) % | 11.9 | | 10.8 | | 10.85 | | 11.20 | |
| Δ FDC-ODC | 5.3 | | 3.8 | | 2.85 | | 2.95 | |
| Δ T. base | 24.5 | | 21.5 | | 20.50 | | 20.0 | |
| Δ T. core | 89.0 | | 87.0 | | 79.5 | | 76.5 | |
| Permanent deformation % | 6.3 | | 5.0 | | 4.5 | | 4.35 | |

(1) expressed in Pa, to be multiplied by $10^5$
σ = standard deviation

TABLE XIII

| TESTS | 24 | | 25 | |
|---|---|---|---|---|
| Silane A 189 (% on silica) | 1.0 | | 1.5 | |
| Succinimide (% on silica) | 3.0 | | 3.0 | |
| Rheometer at 150° C. | | | | |
| Torque: Min Max | 14.5–85.0 | | 14.0–80 | |
| Δ Torques | 70.5 | | 66 | |
| Induction period - Index | 4mn45s–7mn30s | | 4mn–6mn30s | |
| Optimum vulcanization time | 12mn15s | | 10mn30s | |
| STATIC PROPERTIES | | σ | | σ |
| Resistance to breaking (1) | 216 | 9 | 224 | 10 |
| Shore A hardness | 69 | | 67 | |
| Modulus at 100% Elongation (1) | 16 | 1.2 | 17.6 | 1.5 |
| Modulus at 300% Elongation (1) | 53 | 2.6 | 56 | 4.5 |
| Elongation % | 697 | 27 | 706 | 32 |
| Trouser tearing kg/cm | 44.4 | 5.7 | 42.0 | 4.7 |
| Abrasion DIN (losses) | 200 | | 199 | |
| GOODRICH FLEXOMETER | | | | |
| load 24 lbs, deflection 22.2%, F 21.4 Hz, temperature 50° C. | | | | |
| Static compression (SC) % | 12.5 | | 13.5 | |
| Original dynamic compression (ODC) % | 8.85 | | 8.7 | |
| Final dynamic compression (FDC) % | 12.65 | | 11.7 | |
| Δ FDC-ODC | 3.8 | | 3.0 | |
| Δ T. base | 20.5 | | 19.0 | |
| Δ T. core | 81.0 | | 77.5 | |
| Permanent deformation % | 4.9 | | 4.6 | |

(1) expressed in Pa, to be multiplied by $10^5$
σ = *standard deviation*

EXAMPLE 3

In this example, the same succinimide as above was used but a different silane was employed. The silane used was a mercapto-silane fixed on a synthetic calcium silicate in a ratio of 70% by weight of active silane, marketed by Union Carbide under the name of DSC-18;

The formulation used was as follows, in parts by weight:

| | | |
|---|---|---|
| [i] | SBR 1500 | 100.0 |
| [ii] | Aromatic oil (Dutrex 729 FC) | 20.00 |
| [iii] | Zinc oxide | 4.00 |
| [iv] | Stearic oxide | 1.50 |
| [v] | Sulfur | 2.80 |
| [vi] | Permanax I PPD | 1.50 |
| [vii] | Permanax 6 PPD | 1.50 |
| [viii] | Vulcafor CBS | 3.00 |
| [ix] | Zeosil 45 | 60.00 |
| [x] | Silane and succinimide | (See Table XIV) |

The results obtained are given in Table XIV.

Test 26 represented the control, that is to say, without succinimide and without silane.

It is to be noted that:

(a) In the rheometer, silane used alone reduced viscosity as compared with the control, and the combination of silane+succinimide had a greater effect;

(b) Silane alone and the combination of silane+succinimide improved the static and dynamic properties.

Thus, the incorporation of succinimide in combination with and partial substitution for the silane considerably reduces the viscosity of the crude mix. Indeed, this combination reduces viscosity to a greater extent than silane alone, while keeping the properties at the same level at lower cost.

triethoxysilylpropyl)tetrasulfide (silane SI 69). The same control sample (test 26) will therefore be referred to.

The results are set out in Table XV.

It will be seen that this silane alone produced the viscosity of the crude mix (tests 30–33). However, combinations of 1 part of silane with 3 parts of succinimide (test 34) and 1 part of silane with 4 parts of succinimide (test 35) reduced viscosity as much as silane alone, or

TABLE XIV

| TESTS | 26 | 27 | 28 | 29 |
|---|---|---|---|---|
| ADDITIVES | | | | |
| DSC 18 (containing 70% of active product) (1) | 0 | 1.0(*) | 3.0(*) | 1.0(*) |
| Succinimide (1) | 0 | 0 | 0 | 3.0 |
| Rheometer at 150° C. | | | | |
| Torque: Min Max | 20–116 | 185–116 | 15–115 | 13–108 |
| Δ Torques | 96 | 97.5 | 100 | 95 |
| Scorch time - Index | 7mn 15s–10mn 15s | 7mn 45s–9mn | 6mn 15s–7mn 45s | 6mn 45s–7mn 15s |
| Optimum vulcanization | 17mn 30s | 15mn 45s | 14mn | 14mn |
| STATIC PROPERTIES | | | | |
| Resistance to breaking (2) | 165 | 183 | 197 | 191 |
| Shore hardness A | 72 | 75 | 75 | 72 |
| Modulus at 100% Elongation | 19.6 | 30 | 33.8 | 26.5 |
| Modulus at 300% Elongation | 14 | 92.6 | 109.7 | 78 |
| Elongation % | 560 | 46.7 | 493 | 57.4 |
| Trouser tearing kg/cm | 27.8 | 24 | 16 | 27 |
| Abrasion DIN (losses) | 214 | 165 | 150 | 184 |
| GOODRICH FLEXOMETER | | | | |
| load 24lbs, deflection 22.2%, F 21,4 Hz, temperature 50° C. Static compression (SC) % | 8.6 | 8.15 | 8.25 | 9 |
| Original dynamic compression (ODC) % | 3.2 | 0.7 | 0.9 | 2.15 |
| Final dynamic compression (FDE) % | 6.0 | 1.15 | 0.9 | 2.65 |
| Δ FDC-ODC | 2.8 | 0.45 | 0 | 0.5 |
| Δ T. base | 34 | 25.5 | 25.5 | 28 |
| Δ T. core | 122 | 81.5 | 84.5 | 91 |
| Permanent deformation % | 4.5 | 2.55 | 2.6 | 2.25 |

(1) expressed as % relative to silica
(2) expressed in Pa, to be multiplied by $10^5$
(*) expressed as active product

EXAMPLE 4

This was carried out under the same conditions as the previous example, except that the silane used was bis(3- more so, which is economically valuable, while maintaining an appropriate level in the static and dynamic properties.

TABLE XV

| TESTS | 30 | 31 | 32 | 33 | 34 | 35 |
|---|---|---|---|---|---|---|
| ADDITIVES | | | | | | |
| Silane SI 69 (1) | 1.0 | 2.5 | 5.0 | 7.5 | 1.0 | 1.0 |
| Succinimide (1) | 0 | 0 | 0 | 0 | 3.0 | 4.0 |
| Rheometer at 150° C. | | | | | | |
| Torque: Min Max | 17.5–118 | 18–118 | 16.5–122 | 13.102 | 15–110 | 12–102.5 |
| Δ Torques | 100.5 | 100 | 105.5 | 89 | 95 | 90.5 |
| Scorch time - Index | 7mn 30s–9mn 30s | 7mn 30s–9mn 30s | 7mn–9mn | 7mn–8mn 15s | 5mn 45s–8mn 30s | 5mn–8mn 15s |
| Optimum vulcanization time | 17mn | 17mn | 16mn | 15mn 15s | 14mn 15s | 14mn 15s |
| STATIC PROPERTIES | | | | | | |
| Resistance to breaking (2) | 176 | 173 | 193 | 159 | 187 | 182 |
| Shore A hardness | 74 | 76 | 78 | 75 | 72 | 72 |
| Modulus 100% Elongation (2) | 30 | 33 | 42 | 31 | 28 | 26 |
| Modulus 300% Elongation (2) | 89.5 | 102 | 135 | 119 | 80 | 84 |
| Elongation % | 512 | 473 | 439 | 376 | 552 | 533 |
| Trouser tearing kg/cm | 25.4 | 28.4 | 14.5 | 3.0 | 45.9 | 19 |
| Abrasion DIN (losses) | 172 | 163 | 148 | 143 | 184 | 179 |
| GOODRICH FLEXOMETER | | | | | | |
| load 24lbs, deflection 22.2%, F-21.4 Hz, temperature 50° C. Static compression (SC) % | 8.2 | 7.2 | 7.0 | 8.1 | 8.35 | 8.8 |
| Original dynamic compression (ODC) % | 0.9 | 0 | 0.8 | 0 | 1.65 | 2.6 |
| Final dynamic compression (FDC) % | 1.0 | 0 | 0.8 | 0.15 | 1.95 | 3.0 |
| Δ FDC-ODC | 0.1 | 0 | 0 | 0.15 | 0.3 | 0.4 |
| Δ T. base | 26 | 24 | 21 | 21 | 26 | 28 |

TABLE XV-continued

| TESTS | 30 | 31 | 32 | 33 | 34 | 35 |
|---|---|---|---|---|---|---|
| Δ T. core | 87 | 83 | 69 | 66.5 | 86.5 | 89.5 |
| Permanent deformation % | 2.5 | 2.1 | 1.8 | 1.5 | 2.8 | 2.5 |

(1) expressed as % relative to the filler
(2) expressed in Pa, to be multiplied by $10^5$

EXAMPLE 5

The same general formulation was used, but 30 parts of silica were replaced by 30 parts of carbon black (black N 326); the silane was gamma-mercaptopropyl-trimethoxysilane (A 189) and the succinimide was the same as in the previous examples.

The results are set out in Table XVI.

It will be noted that:
(a) In the rheometer, the properties were not substantially changed as a function of the combinations of silane and succinimide;
(b) The same was true of the static properties; and
(c) As regards dynamic properties, the combination of 1% silane with 3% succinimide gave less heating and less permanent deformation than were obtained with 1% silane alone. Moreover, the combination of 1% silane with 3% succinimide was also substantially better than the composition containing 3% silane.

The unexpected conclusion is that, in the mix containing black and silica, the behavior of the combination of 1 part silane and 3 parts succinimide led to the same conclusions about dynamic properties as were arrived at with mixes containing silica only as the filler, i.e. the dynamic properties were improved as compared with 1% and 3% of silane alone, with the economic advantages already pointed out.

EXAMPLE 6

In this example succinimide was brought on a carrier. The formulation used was as follows in parts by weight:

| [i] Natural rubber SMR 5L | 100.00 |
|---|---|
| [ii] Stearic acid | 1.50 |
| [iii] Zinc oxide | 4.00 |
| [iv] Antioxidant  -Permanax 6PPD | 1.50 |
|                   -Permanax IPPD | 1.50 |
| [v] Vulcafor CBS | 1.50 |
| [vi] Oil Dutrex | 20.00 |
| [vii] Precipitated silica BET area of 172 m²/g | 60.00 |
| [viii] Polyethylene glycol (PEG 4000) | 3.00 |
| [ix] Silane and succinimide | (See Tables XVII and XVIII) |
| sulfur | 2.80 |

The succinimide is a product very visqueous, difficult to work and handle, in order to avoid this inconvenient is was brought on a siliceous carrier in the following proportions:
  66% of succinimide
  34% of siliceous carrier it appears that this working does not alter the efficiency of this product according to the present invention.

TABLE XVII

| | BANBURY - ONE MIXING | | | |
|---|---|---|---|---|
| Silane A 189 (%) | 0.0 | 3.0 | 1.0 | 0.0 |
| Succiminide (as % of active product) | 0.0 | 0.0 | 3.0 (1) | 4.0 (2) |

TABLE XVI

| TESTS | 36 | 37 | 38 |
|---|---|---|---|
| ADDITIVES | | | |
| SILANE A 189 (1) | 1 | 3 | 1 |
| Succinimide (1) | 0 | 0 | 3 |
| Rheometer at 150° C. | | | |
| Couple: Mini Maxi | 10.5–84.0 | 10.0–83.0 | 9.5–82.5 |
| Δ Couples | 73.5 | 73 | 73 |
| Scorch - Index | 11mn 15s–8mn | 10mn 30s–6mn 30s | 16mn 15s–7mn |
| Optimum vulcanization time | 19mn 15s | 17mn | 16mn 15s |
| STATIC PROPERTIES | | | |
| Resistance to breaking (2) | 202 | 206 | 216 |
| Shore A hardness | 68 | 67 | 67 |
| Modulus 100% Elongation | 26 | 25.5 | 27 |
| Modulus 300% Elongation | 90 | 86.5 | 90 |
| Elongation % | 570 | 570 | 580 |
| Trouser tearing kg/cm | 33 | 39 | 36 |
| Abrasion DIN (losses) | 153 | 137 | 142 |
| GOODRICH FLEXOMETER | | | |
| load-24lbs, deflection-22.2% F-21.4 Hz, α-50° C. | 13.55 | 13.5 | 14.15 |
| Static compression % | | | |
| Dynamic compression % beginning | 5.1 | 5.0 | 5.55 |
| Dynamic compression % end | 5.45 | 5.1 | 5.50 |
| Δ CDF-CDO | 0.35 | +0.1 | ++0 |
| Δ T. base | 32.5 | 30.5 | 30.0 |
| Δ T. core | 98.5 | 95.0 | 93 |
| Permanent deformation % | 3 | 2.7 | 2.6 |

(1) expressed as % relative to the filler
(2) expressed in Pa, to be multiplied by $10^5$

TABLE XVII-continued

| BANBURY - ONE MIXING | | | | |
|---|---|---|---|---|
| Rheometer at 150° C. | | | | |
| Torque Min | 24.0 | 15.0 | 14.5 | 15.5 |
| Torque Max | 81.0 | 68.0 | 77.5 | 75.0 |
| ΔTorque | 57.0 | 53.0 | 63.0 | 59.5 |
| Scorch time = T + 2 | 8.0 | 3.25 | 4.0 | 4.75 |
| Index + T.90 − T.2 | 11.5 | 9.25 | 8.75 | 9.75 |
| Optimum = T.90 | 19.5 | 12.5 | 12.75 | 14.5 |
| Resistance to breaking Mpa | 20.1 | 22.7 | 23.1 | 21.4 |
| Hardness Shore A | 66 | 62 | 65 | 62 |
| Modulus 100% M.Pa | 1.5 | 2.0 | 1.9 | 1.7 |
| Modulus 300% M.Pa | 3.5 | 5.6 | 4.9 | 4.0 |
| Elongation | 672 | 679 | 690 | 684 |
| Tearing kg/cm | 52 | 44 | 65 | 65 |
| Abrasion DIN | 285 | 204 | 225 | 276 |

(1) −3% on active product, 4.5% as product on silica
(2) −4% on active product, 6% as product on silica

TABLE XVIII

| BANBURY - ONE MIXING | | | | |
|---|---|---|---|---|
| SILANE A 189 (%) | 0.0 | 3.0 | 1.0 | 0.0 |
| Succinimide (as % of active product) | 0.0 | 0.0 | 3.0 (1) | 4.0 (2) |
| Dynamic Properties Goodrich Flexometer | | | | |
| Static compression % (SC) | 13.3 | 12.7 | 11.3 | 12.2 |
| Original dynamic compression (ODC) % | 14.7 | 10.8 | 9.1 | 12.1 |
| Final dynamic compression (FDC) % | 11.3 | 14.8 | 14.4 | 25.7 |
| ΔFDC-ODC | 2.1 | 4.0 | 5.3 | 13.6 |
| Heating | | | | |
| ΔT. base °C. | >60 | 23 | 23.5 | 34 |
| ΔT. core °C. | >150 | 83.5 | 87.5 | 107.5 |
| Permanent deformation % | 22.5 | 6.9 | 7.1 | 12.3 |

(1) −3% on active product, 4.5% as product on silica
(2) −4% on active product, 6% as product on silica While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An improved elastomeric composition of matter comprising a natural or SBR rubber, an inorganic filler, and a coupling agent for coupling said rubber to said filler, said coupling agent comprising at least one silane and at least one alkenyl succinimide.

2. The composition of matter as defined by claim 1, wherein said succinimide is an alkenyl succinimide, the alkenyl portion of which has from 3 to 100 carbon atoms.

3. The composition of matter as defined by claim 2, wherein said alkenyl portion has from 3 to 12 carbon atoms.

4. The composition of matter as defined by claim 2 or 3, wherein said alkenyl succinimide comprises the condensation product of a polyamine with an alkenyl succinic anhydride.

5. The composition of matter as defined in claim 4, wherein said polyamine is a polyalkylene amine wherein the alkylene radicals are straight or branched-chain and contain from 2 to 12 carbon atoms.

6. The composition of matter as defined by claim 5, wherein said polyalkylene amine is tetraethylene pentamine.

7. The composition of matter as defined by claim 5, wherein said polyalkylene amine bears at least one hydroxyalkyl or aminoalkyl substituent on a nitrogen atom thereof.

8. The composition of matter as defined by claim 4, wherein said polyamine is a polyoxaalkylene amine wherein the oxaalkylene radicals are straight or branched-chain and each contain 2 or 3 carbon atoms.

9. The composition of matter as defined by claim 4, wherein said polyamine is a tertiary aminoalkyl amine having the structural formula

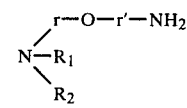

in which r represents an ethylene or propylene radical, r' represents a trimethylene or propylene radical, $R_1$ represents an —r—O—r'—$NH_2$ or —r'—$NH_2$ radical, and $R_2$ represents an —r—O—r'—$NH_2$, —r'—$NH_2$, $C_2$-$C_4$ alkyl or phenyl radical.

10. The composition of matter as defined by claim 4, wherein the alkenyl radical comprising said alkenyl succinic anhydride is derived from a $C_3$-$C_{30}$ mono-olefin, an oligomer or polymer of a $C_2$-$C_{30}$ mono-olefin, or a copolymer comprising two or more of said olefins or one of said olefins with a dienic or vinylaromatic comonomer.

11. The composition of matter as defined by claim 10, wherein said alkenyl radical comprising said alkenyl succinic anhydride is derived from an oligomer or polymer of ethylene, propylene, 1-butene, isobutene, 3-cyclohexyl-1-butene or 2-methyl-5-propyl-1-hexene.

12. The composition of matter as defined by claim 11, wherein said alkenyl succinic anhydride is tetrapropenyl succinic anhydride.

13. The composition of matter as defined by claim 1, 2 or 3, wherein said silane has the structural formula

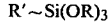

in which R' represents a reactive organic group connected to the silicon atom by a short alkyl chain and OR represents a hydrolyzable alkoxy group.

14. The composition of matter as defined by claim 13, wherein the reactive organic group is a mercapto or azo containing group.

15. The composition of matter as defined by claim 14, wherein the silane is gamma-mercaptopropyltrimethoxysilane.

16. The composition of matter as defined by claim 1, further comprising a plasticizer.

17. The composition of matter as defined by claim 16, wherein said plasticizer is an aromatic oil.

18. The composition of matter as defined by claim 1, wherein said inorganic filler is a natural or synthetic silica.

19. The composition of matter as defined by claim 1, wherein said inorganic filler is a synthetic silica.

20. The composition of matter as defined by claim 19 wherein said synthetic silica comprises precipitated silica particulates.

21. A shaped article comprising the composition of matter as defined by claim 1.

22. A vulcanized shaped article comprising the composition of matter as defined by claim 1.

23. The composition of matter as defined by claim 18 comprising at least 4 parts by weight of said coupling agent to every 100 parts by weight of silica.

* * * * *